(12) United States Patent
Kuhne

(10) Patent No.: US 6,427,515 B1
(45) Date of Patent: Aug. 6, 2002

(54) APPARATUS FOR THE MECHANICAL TREATMENT OF WORKPIECES

(75) Inventor: Timm Kuhne, Bad Sachsa (DE)

(73) Assignee: Eckold GmbH & Co. KG, St. Andreasberg (DE)

( * ) Notice: Subject to any disclaimer, the term of this patent is extended or adjusted under 35 U.S.C. 154(b) by 0 days.

(21) Appl. No.: 09/620,967

(22) Filed: Jul. 21, 2000

(30) Foreign Application Priority Data

Jul. 21, 1999 (DE) .......................................... 199 34 288

(51) Int. Cl.⁷ .............................................. B21D 37/00
(52) U.S. Cl. .................................. 72/453.03; 72/453.16
(58) Field of Search ..................... 81/301; 72/453.03, 72/453.04, 453.16, 453.17; 192/129 R, 129 B; 83/573

(56) References Cited

U.S. PATENT DOCUMENTS 5,806,362 A * 9/1998 Dubugnon ................ 72/453.03

FOREIGN PATENT DOCUMENTS

| DE | 1952068 | 11/1995 |
| EP | 0299477 | 1/1989 |
| GB | 2074487 | 4/1981 |

* cited by examiner

Primary Examiner—Lowell A. Larson
(74) Attorney, Agent, or Firm—Townsend and Townsend and Crew LLP

(57) ABSTRACT

The invention relates to an apparatus for the mechanical machining of workpieces, having two tong members in the form of two-armed levers which are mounted rotatably with respect to each other and to whose working ends tool instruments can be fastened, the one tong lever having a fixed tong handle and accommodating a driving piston whose ram can be moved over a selectable advancing stroke path towards a driving end of the other tong member, as a result of which the working end of the other tong member can be moved onto the working end of the one tong member counter to a restoring spring in order to execute a working stroke, the other tong member having, as the driving end, a pivotably coupled spacer which can be orientated towards the ram with a tension spring, which holds the spacer outside an advancing stroke path of the ram, acting on the free end of the said spacer, and on which spacer at least one driver element is provided which is engaged with a pivotable actuating element which pivots the spacer counter to the tension spring force and, supporting it with respect to the one tong member, into the advancing stroke path of the ram keeping the driving ends spaced apart and converging the working ends until they reach a closed position, and which actuating element has a projection which, when the closed position is reached, can be moved against a switch in order to trigger the working stroke.

17 Claims, 4 Drawing Sheets

APPARATUS FOR THE MECHANICAL TREATMENT OF WORKPIECES

This application is claims the benefit of priority from German application no. 199 34 288.1 filed on Jul. 21, 1999, under 35 USC §119, the full disclosure of which is incorporated herein by reference.

BACKGROUND OF THE INVENTION

The invention relates to an apparatus for the mechanical treatment of workpieces.

SUMMARY OF THE INVENTION

GB 20 74 487 A discloses a device for opening a flange connection having two pincer arms which are formed by levers mounted rotatably with respect to one another. The ram of a driving piston acts on one pincer arm, while the other pincer arm is fastened rigidly to the driving piston. An actuating lever can be used to trigger a working stroke by means of which the first pincer arm can be moved towards the fixed pincer arm.

EP 0 299 477 A1 discloses a hydraulically actuated hand-held tool, such as tongs or shears, for cutting and/or deforming pieces made of high-strength material, having a hydraulic system with a pressure-medium working cylinder connected downstream in which a pressure piston moving the tool can be displaced, and the pressure medium being pumped into the working cylinder by means of a hand lever coupled to a control piston. In this case, the pressure piston moves outwards and thereby presses the two tong levers against each other by their shearing surfaces or the like. With the pressing of the shearing surfaces or the like against one another, the workpiece pressed against, for example a bolt or a pipe, is severed or worked.

Manually guided tools have been used for many years for carrying out operations on a mechanical workpiece. However, the design as a hand-held tool involves the risk of the hand or individual fingers of an operator getting between the working ends of opened arms and being crushed there during a subsequent working stroke.

DE 19542 068 A1 discloses pneumatically operated handheld tools in which a mouth formed by moveable tong jaws is distinguished in that the mouth is shut in its open position by means of a moveable displacement body accommodated in it, for example a leaf spring, in order to prevent the unintentional ingress of foreign bodies. This in particular prevents a risk of injury by the operator's fingers getting into the mouth.

It is furthermore known to close an apparatus for the mechanical treatment of workpieces to a sufficient extent that individual fingers of an operator no longer pass between the working ends and then to trigger the actual working stroke of the driving piston. In the case of the press-joining tool EMF 30/3L from Eckold a spacer is provided for this purpose, the spacer being pivoted, as the working ends are being closed, between the driving end of a moveable leg and the ram of the driving piston, so that transmission of the working stroke of the rain to the moveable leg is only possible if a force-transmission chain is completed. If the apparatus is not closed, an activated working stroke of the driving piston would not result in there being contact between the ram and leg, since the length of the working stroke is too short to reach the leg.

However, it has proven disadvantageous that an additional second handle is needed to pivot the spacer in, as a result of which both hands are at least temporarily needed in order to operate the apparatus. Operation is made more difficult as a result.

SUMMARY AND OBJECTS OF THE INVENTION

The object of the invention is therefore to provide a hand operated apparatus for the mechanical treatment of workpieces which make operation possible using just one hand.

This provides an apparatus, in particular with bring about a manual closing movement and the subsequent triggering of the power stroke using the same actuating element. An apparatus of this type can be operated exclusively using one hand and without any fitting work. Furthermore, an apparatus of this type can provide a comparatively large opening extent between the working ends resulting in an extended spectrum of use with regard to the workpiece regions to be mechanically treated.

In conjunction with the design of the spacer as a single-armed lever whose free end is coupled to a tension spring, disengagement of the spacer from the force-transmission chain is ensured. Only when a counter force which overcomes the tensile force of the tension spring is used is engagement of the spacer into the force-transmission chain made possible.

In addition, engagement of the spacer can be ensured exclusively if an operator is firmly pressing a one-handed operating lever. In the event of the operating force slackening slightly, provision may be made for the spacer itself to be pulled out of the force-transmission chain again during the working stroke, as a result of which the working stroke is broken off. This means additional safety, since after a working stroke is triggered the operation does not inevitably have to be completed.

The actuating element may be operable in the manner of a trigger on the apparatus handle in order to engage the spacer counter to the tension spring force. Also, a pressure point may be incorporated into the actuating path of the actuating element, which point indicates that the spacer has engaged into the force-transmission chain between the ram and pivotable apparatus, and serves as a warning of the forthcoming triggering of the working stroke.

Further refinements of the invention can be taken from the following description and from the dependent claims.

DESCRIPTION OF THE SPECIFIC EMBODIMENTS

Figure 1:
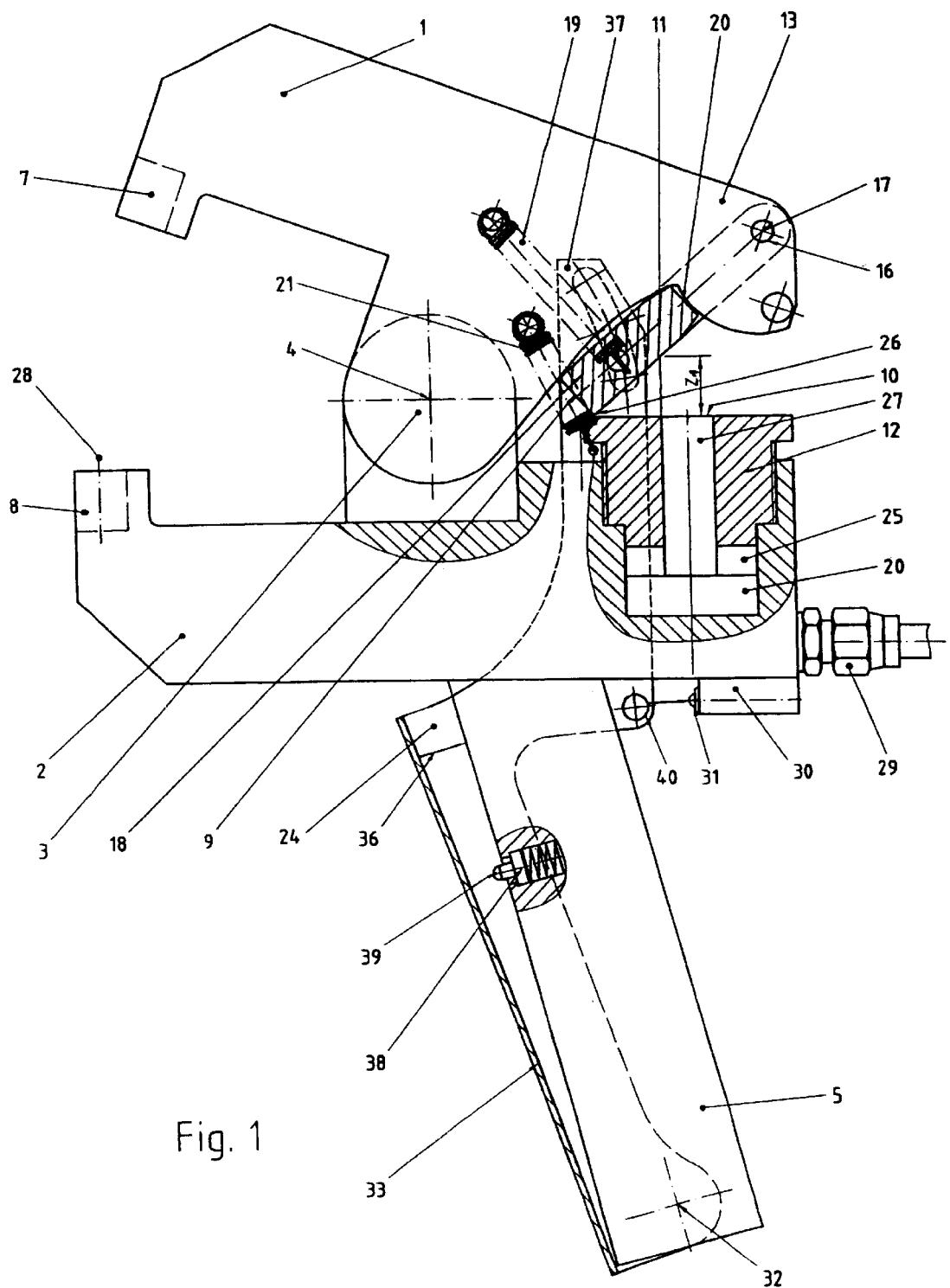
FIG. 1 shows, in a partially cut-away side view, the apparatus in the opened state.

The invention relates to an apparatus for the mechanical treatment of workpieces, in particular tongs for shearing, cutting, punching, perforating, riveting and joining metal sheets, pipes and profiles, having the tong design described below by way of example.

FIGS. 1 to 4 show tongs having a first tong member 1 and a second tong member 2 which are each designed as two-armed tong legs and are connected to each other via a tong joint 3 in a manner such that they can pivot about the axis 4. In this case, a tong handle 5 is attached in a fixed manner to the tong member 2. The tong member 2 is therefore also frequently referred to as the fixed tong member 2, while the tong member 1 is referred to as the moveable tong member 1.

The tong members 1, 2 have a respective working end 7, 8 to which a tool can be fastened in a tool socket, and have a respective rear end at the handle end. A punch and die are used in particular as the tools. By means of a restoring spring 21 which acts on both tong members 1, 2, preferably on those lever arms of the two-armed tong members 1, 2 which lie opposite the working ends, the working ends 7, 8 are held open and can only be brought closer together counter to the restoring force of the spring 21.

The tong members 1, 2 furthermore have a respective driving end 9, 10 which lies opposite the working ends 7, 8 and in the case of the tong member 1 is formed by the spacer 11 and in the case of the tong member 2 is formed by an end side of a ram 27. As can be seen from FIG. 1 to FIG. 3, the spacer 11 is fastened pivotably to a rear end 13 of the moveable tong member 1. For this purpose, the spacer 11 has lateral clips 14, 15 which are fastened on both sides to the rear end 13 by means of a fastening bolt 16 which defines a pivot axis 17. The spacer 11 constitutes a one-armed lever which forms an extension arm of the tong member 1.

Acting on a free end 18 of the spacer 11 is a tension spring 19 whose other end is fastened to the upper tong member 1. The tensile force of the tension spring 19 has the effect that the spacer 11 is pulled onto the tong member 1 and therefore into an inner space in the tongs. Furthermore, at least one driver element 22, preferably two driver elements 22, 23 (cf. FIG. 4) is provided on the spacer 11, the said driver element being acted upon by an actuating element 24 whose outline is illustrated and which is described in further detail below. Alternatively, the actuating element 24 can act directly on the spacer 11 without interconnection of driver elements.

The spacer 11, which is illustrated in FIG. 1 disengaged from the flow of force, is positioned outside an advancing stroke path of a ram 27 by the tension spring 19, the restoring spring 21, which pulls the tong member 1 together with the spacer 11 towards the lever arm, facing away from the working end 8, with an adjusting screw 12 bounding the ram on the outside, until the spacer strikes against the adjusting screw 12 of the tong member 2 (the point is indicated by 26), the said tong member in this respect forming a stop.

On the lever arm which faces away from the working end 8 the tong member 2 has a driving piston 20 whose ram 27 has an advancing stroke path in a direction parallel to a tool axis 28 as the working stroke. The advancing stroke of the driving piston is restricted by a lower end of the adjusting screw 12 and can be selected by the latter. The driving piston 20 can be acted upon pneumatically or hydraulically, for which purpose a driving-medium connection 29 is provided. The tong member 2 furthermore has a switch 30. When the button 31 is actuated, the advancing stroke of the driving piston 20 is triggered. After this actuating force is cancelled, a return stroke of the driving piston 20 begins.

The actuating element 24 which is coupled pivotably to the tong handle 5 is provided for engaging the spacer 11 into an advancing stroke path of the ram 27, in order to provide a force-transmission chain between the ram 27 and the moveable tong member 1. The actuating element 24 is mounted such that it can be pivoted about the axis 32 at the handle end of the tong handle 5. The actuating element 24 is formed by a tong handle shell 33 which is mounted pivotably as a single-sided lever on the tong handle end and has at least one actuating arm 34, 35 which is brought into engagement directly or via at least one driver element 22, 23 fastened to the spacer 11, in such a manner that the tension spring 19 acting on the spacer 11 bends the tong handle shell 33 out with respect to the tong handle 5 under spring prestress. The actuating arm or actuating arms 34, 35 can be designed as tongues guided laterally past the one tong member 2. Tongue-shaped actuating arms 34, 35 of this type can have an external contour which is selected in such a manner that the driving mechanism surrounding the driving ends of the tong members 1, 2 is covered laterally such that it cannot be gripped from behind manually.

If the tong handle shell 33 is pressed towards the tong handle 5 in the arrow direction 36, the actuating arm or actuating arms 34, 35, as parts which are connected fixedly to the tong handle shell 33, follow this movement and pivot counter to the tensile force of the tension spring 19. The spacer 11, which is fixed rotatably at the rear end 13 of the tong member 1, is thereby pivoted into the advancing stroke path of the ram 27, with a degree to which the tong handle shell 33 is bent out being selected in such a manner that the pivoting path thereof leads to the spacer 11 being completely engaged. As the spacer 11 is being pivoted into the advancing stroke path of the ram 27, it is supported by its lower end, which forms the driving end 9 of the tong member, on the upper end of the adjusting screw 12 placed into the tong member 2. For this purpose, a guiding track may be provided on the driving end 10. That end which can be recognized in the figures as the upper end of the adjusting screw 12 may have a surface deviating from a plane for this.

Figure 2:
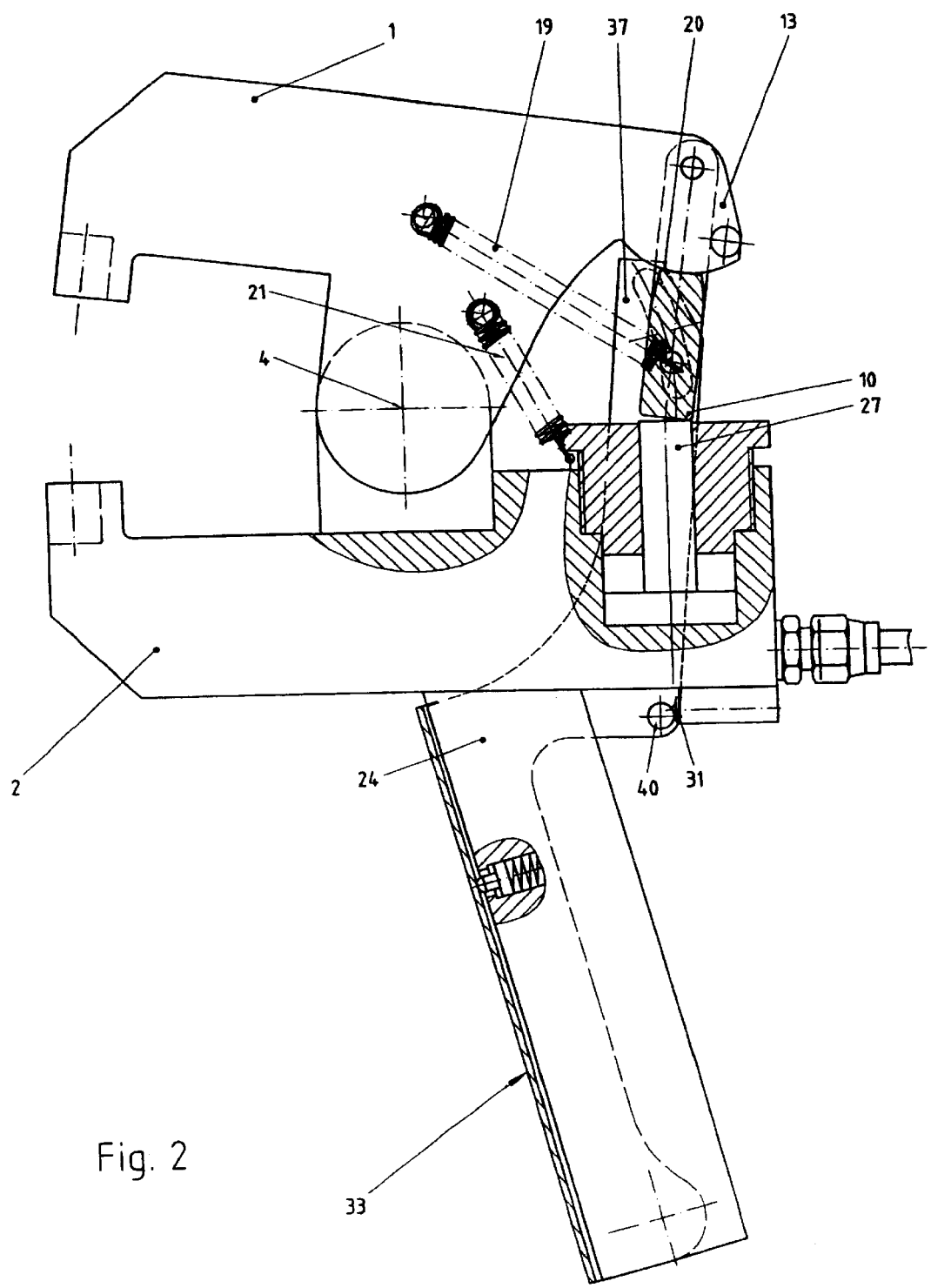
FIG. 2 shows the apparatus according to FIG. 1 in the closed state before a working stroke is triggered.

The pivoting of the spacer 11 into the advancing stroke path of the ram 27 causes it to be placed upright and causes its length to increase in the direction of the advancing stroke path of the ram 27, as a result of which the tong member 1 is placed counter to the force of the restoring spring 21 by its driving end 9 onto the driving end 10 of the tong member 2 and the working ends 7, 8 converge (cf. FIG. 2).

The length of the spacer 11 during its orientation towards the advancing stroke direction of the ram 27 can be selected in such a manner that as far as a closed position according to FIG. 2 the working ends 7, 8 converge exclusively by the action of a manual force. A closed position of this type is, for example, present if the tools accommodated by the working ends 7, 8 have converged up to 6 mm.

The pivoting movement executed by the spacer 11 is therefore accompanied by a pivoting movement of the tong member 1, to which the spacer 11 is fastened, and therefore implements the manual closing movement. The spacer 11 is set upright during this. So that this combined movement is possible through actuation of the actuating element 24, the actuating member 24 has at least one actuating arm 37 for the direct actuation of the spacer 11 or actuation imparted via driver elements 22, 23.

Finally, a projection 40 is provided on the actuating element 24, the projection moving at the end of the closing movement against a switch 30 which triggers the advancing stroke of the ram 27 and therefore the actual working stroke for a joining procedure, for example.

Cancellation of the actuating force applied to the actuating element 24, i.e. the tong handle shell 33 moves counter to the arrow direction 36, enables the said actuating element, because of the compressive force of at least one spring element 38, 39, to execute a rotational movement about the bearing axis 32, as a result of which the projection 40 releases the switch 30 and therefore triggers a return stroke of the ram 27. After cancellation of the manual closing force transmitted by the actuating element 24 to the spacer 11, the tensile force of the spring element 19 enables the spacer 11 to move away from the ram 27 in the direction of the bearing axis 4 of the tong members 1, 2 and to be positioned on an inner region of the tong member 1. Furthermore, the tensile force of a spring element 21 causes the other tong member 1 to rotate with respect to the one tong member 2 about a common bearing axis 4 in such a manner that the driving ends of the tong members 1, 2 converge, as a result of which the tongs move into their opening position (according to FIG. 1).

The tong handle 5 can furthermore have at least one supporting element 38 with a spring-prestressed pressure pin 39 which, when the tong handle shell 33 is pressed against the tong handle 5 shortly before the actuating element 24 moves the projection 40 against the switch pin 31, applies an additional compressive force to the actuating element 24.

Figure 3:
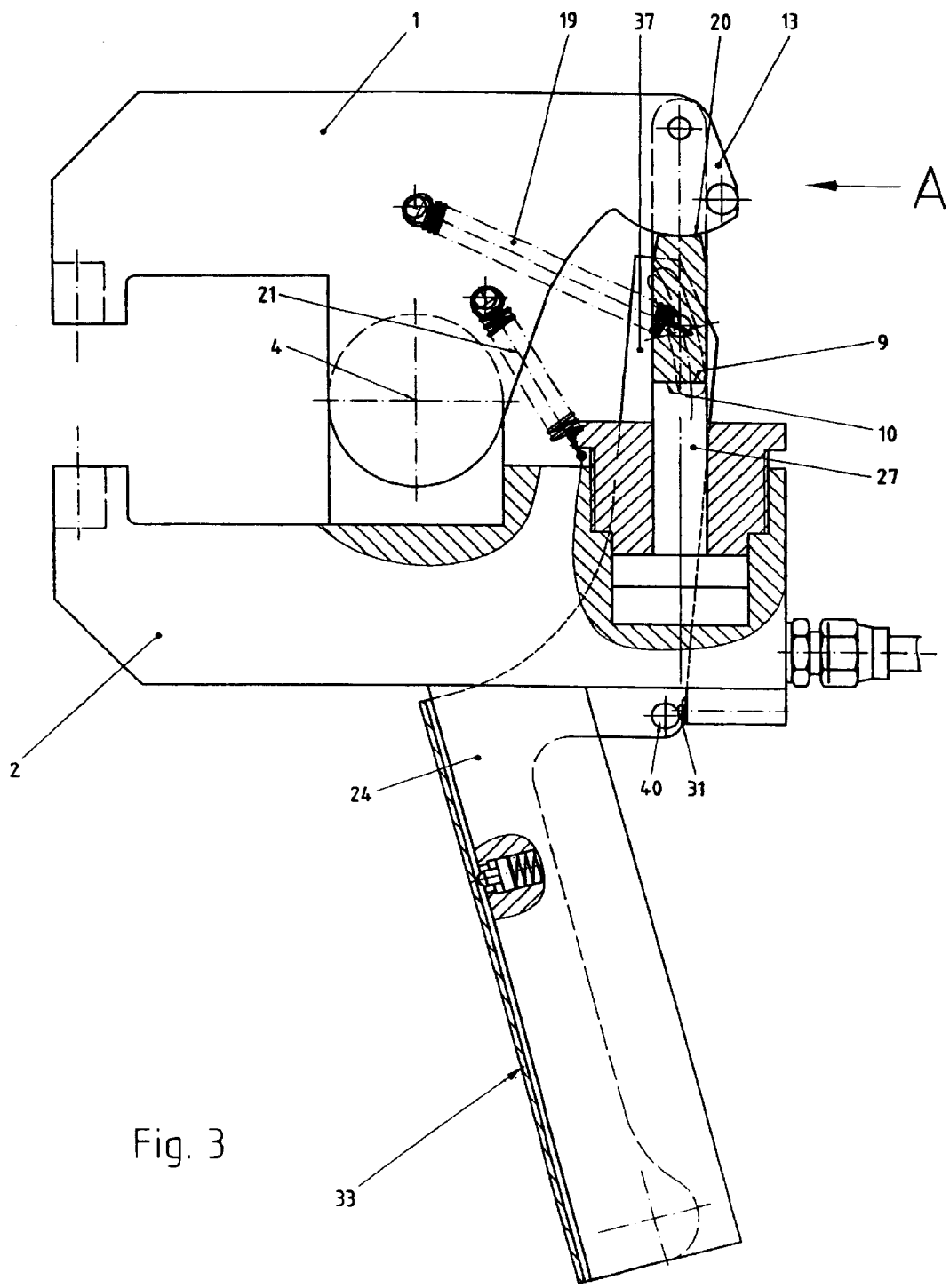
FIG. 3 shows the apparatus according to FIG. 1 in the closed state at the end of a working stroke.
Figure 4:
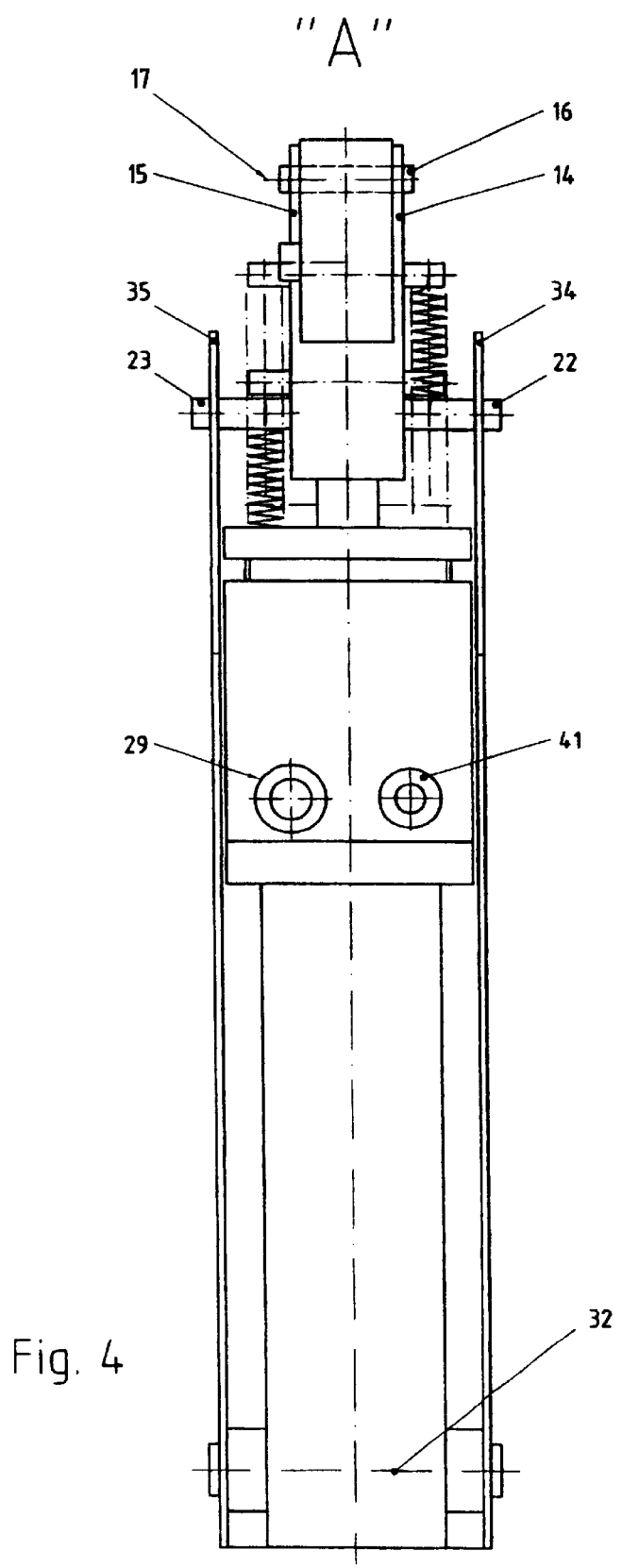
FIG. 4 shows a view A of FIG. 3.

FIG. 3 shows the above-described press-joining tongs at the end of the working stroke. The spacer 11 closes the force-transmission chain and the ram 27 is extended by its maximum advancing stroke. In this case, the ram 27 has a stroke axis which lies parallel to the longitudinal axis of a tool which can be fastened in the tong member 2.

Although the invention has been described in some detail by way of illustration and example, for purposes of clarity and understanding, it will be obvious that certain changes and modifications may be practiced within the scope of the invention.

What is claimed is:

1. Apparatus for the mechanical treatment of workpieces, said apparatus comprising:

a first tong member having a working end and a driving end;

a moveable second tong member pivotally attached to the first tong member and having a working end and a driving end, wherein tools can be removably attached to the working ends of both tong members;

a tong handle fixed to the first tong member;

a restoring spring attached between the tong members to urge the working ends open;

a ram and piston assembly disposed at the driving end of the first tong member, the ram having a ram stroke path;

a spacer pivotally attached to the moveable second tong member and disposed to engage the driving end of the first tong member when pivoted into alignment with the ram stroke path, wherein such engagement spaces the driving ends to partially close the working ends;

an actuator element pivotally attached to the handle, said element having a projection and an actuator arm which engages and pivots the spacer toward alignment with the ram stroke path when the actuator is pivoted toward the handle;

a tension spring urging the actuator element away from the handle; and a switch disposed proximate the actuator element, wherein full pivoting of the actuator element toward the handle engages the projection against the switch to trigger the ram to act against the spacer to further space the driving ends to further close the working ends.

2. Apparatus according to claim 1, wherein the ram stroke axis lies parallel to a longitudinal axis of a tool fastened to the tong members.

3. Apparatus according to claim 1 or 2, wherein the spacer has a length which determines the degree of convergence of the working ends at the closed position.

4. Apparatus according to one of claim 1 or 2, wherein the spacer is designed as an extension arm mounted rotatably on the moveable second tong member.

5. Apparatus according to claim 4, wherein a free end of the spacer engages a supporting surface on an adjusting screw in the first tong member and on which the free end of the spacer slides it is pivoted relative to the ram stroke path.

6. Apparatus according to one of claim 1 or 2, wherein the tension spring acts on the spacer to urge the spacer out of alignment with the ram stroke path.

7. Apparatus according to one of claim 1 or 2, wherein the actuating element comprises by a tong handle shell which is mounted pivotally at one end as a one-sided lever on the tong handle end and at the other end engages on the spacer via at least one actuating arm.

8. Apparatus according to claim 7, wherein at least one actuating arm transmits a forcer directly to the spacer.

9. Apparatus according to claim 7, wherein at least one actuating arm transmits a force to the spacer via at least one driver element.

10. Apparatus according to claim 9, wherein the at least one actuating arm comprises a tongue guided laterally past the one tong member.

11. Apparatus according to claim 10, wherein the tongue-shaped actuating arms have an external contour which laterally covers the driving mechanism surrounding the driving ends of the tong members in a manner such that the said mechanism cannot be gripped from behind manually.

12. Apparatus according to one of claim 1 or 2, wherein the actuating element comprises a tong handle shell is pivotally attached at a lower end of the handle.

13. Apparatus according to claim 12, wherein the tong handle shell can be pressed against the tong handle counter to a spring force in the manner of a trigger.

14. Apparatus according to one of claim 1 or 2, wherein the tong handle has at least one spring-prestressed supporting element which produces a compressive force between the tong handle and the actuating element as an indicator of a shortly forthcoming release of the switch.

15. Apparatus according to one of claim 1 or 2, wherein the working ends can removable receive a punch and die.

16. Apparatus according to one of claim 1 or 2, wherein the ram and piston assembly can be actuated hydraulically or pneumatically.

17. Apparatus according to one of claim 1 or 2, wherein the working ends of tong members can open to a width which is larger than the length of the ram stroke path.

* * * * *